US008026968B2

(12) United States Patent
Pahr

(10) Patent No.: US 8,026,968 B2
(45) Date of Patent: Sep. 27, 2011

(54) METHOD AND APPARATUS PROVIDING DYNAMIC BOOSTED CONTROL SIGNAL FOR A PIXEL

(75) Inventor: Per O. Pahr, Lier (NO)

(73) Assignee: Aptina Imaging Corporation, George Town (KY)

( * ) Notice: Subject to any disclaimer, the term of this patent is extended or adjusted under 35 U.S.C. 154(b) by 838 days.

(21) Appl. No.: 12/081,189

(22) Filed: Apr. 11, 2008

(65) Prior Publication Data
US 2009/0256940 A1 Oct. 15, 2009

(51) Int. Cl.
*H04N 5/335* (2011.01)
(52) U.S. Cl. ...................................................... 348/308
(58) Field of Classification Search ................... 348/308
See application file for complete search history.

(56) References Cited

U.S. PATENT DOCUMENTS

| 6,297,492 | B1 | 10/2001 | Clark |
| 6,670,990 | B1 | 12/2003 | Kochi et al. |
| 7,164,443 | B1 | 1/2007 | Hagihara |
| 7,224,205 | B2 | 5/2007 | Kapoor |
| 7,271,432 | B2 | 9/2007 | Hagihara et al. |
| 7,280,139 | B2 | 10/2007 | Pahr et al. |
| 2004/0217426 | A1 | 11/2004 | Lee |
| 2005/0051808 | A1 | 3/2005 | Hynecek |
| 2006/0114345 | A1* | 6/2006 | Wu et al. ........................ 348/308 |
| 2006/0164152 | A1 | 7/2006 | Tschanz et al. |
| 2006/0233008 | A1 | 10/2006 | Kakumoto et al. |

FOREIGN PATENT DOCUMENTS

| JP | 2006094136 | 4/2006 |
| JP | 2006191623 | 7/2006 |
| WO | WO 2006/034371 A2 | 3/2006 |

OTHER PUBLICATIONS

James T. Kao, et al., "A 175-mV Multiply-Accumulate Unit Using an Adaptive Supply Voltage and Body Bias Architecture," IEEE Journal of Solid-State Circuits, vol. 37, No. 11, Nov. 2002.
Visvesh S. Sathe, et al., "Boost Logic: A High Speed Energy Recovery Circuit Family," VLSI, 2005, Proceedings. IEEE Computer Society Annual Symposium May 11-12, 2005; pp. 22-27.
D. Chang, et al., "IV Input Sampling Circuit with Improved Linearity," Dept. Electr. & Comput. Eng., Oregon State Univ., Corvallis, OR; Electronics Letters; Apr. 12, 2001, vol. 37, Issue 8; pp. 479-481.
A. Fish, et al., "Low Power CMOS Image Sensors Employing Adaptive Bulk Biasing Control ($AB^2C$) Approach," Circuit and Systems 2007, IEEE International Symposium on May 27-30, 2007; pp. 2834-2837.
R.M. Phillip, et al., "Linear Current-Mode Active Pixel Sensor," IEEE Journal of Solid-State Circuits, Nov. 2007, vol. 42, Issue 11; pp. 2482-2491.

* cited by examiner

*Primary Examiner* — William Choi

(57) ABSTRACT

A method and apparatus that generates boosted control signals for a transistor in a target pixel circuit. At least one modified pixel circuit is provided with a transistor layout that approximates a layout of the target pixel circuit. In the modified pixel circuit, one transistor that corresponds to a transistor in the target pixel that is to be controlled provides a voltage used to generate a control signal for the corresponding transistor in the target pixel.

14 Claims, 11 Drawing Sheets

US 8,026,968 B2

METHOD AND APPARATUS PROVIDING DYNAMIC BOOSTED CONTROL SIGNAL FOR A PIXEL

FIELD OF THE INVENTION

The disclosure relates to circuits for providing control signals to transistors in a pixel, and more specifically to circuits that provide boosted voltage control signals for pixel transistors.

BACKGROUND OF THE INVENTION

An n-channel metal-oxide semiconductor ("NMOS") transistor includes a drain, source and gate. When an NMOS transistor is used as a switch, the on/off state of the transistor is determined by the voltage difference between the NMOS gate and either the drain or source. An NMOS transistor is switched "on" if the gate voltage Vg is greater than either the drain voltage Vd or source voltage Vs by at least a threshold voltage Vt. Thus, control voltages applied to an NMOS transistor should be at least equal to the transistor's threshold voltage Vt plus the maximum voltage applied or potentially applied to either the drain or source.

In a conventional five-transistor CMOS image sensor pixel 100 with dual conversion gain, as illustrated in FIG. 1, NMOS transistor gate control voltages need be at least one threshold voltage Vt higher than a supply voltage Vaapix to ensure that the transistors are turned on. The transistors in pixel 100 include a transfer transistor 110, a reset transistor 120, a source follower transistor 130, a row select transistor 140 and a dual conversion gain transistor 150. The transfer transistor 110, when made operative using a transfer control signal TX with activating voltage Vtx, transfers charge collected by a photodiode 112 to a floating diffusion region FD. The reset transistor 120, when made operative using a reset control signal RST with activating voltage Vrst, resets the floating diffusion region FD to the supply voltage Vaapix. The source follower transistor 130 has its gate connected to the floating diffusion region FD and is connected between the supply voltage Vaapix and the row select transistor 140. The source follower transistor 130 converts the potential at the floating diffusion region FD (associated with the transferred charge or reset voltage) into an electrical output voltage signal Vout. The row select transistor 140 is controllable by a row select signal RS with activating voltage Vrs for selectively connecting the source follower transistor 130 and the output voltage signal Vout to a column line of a pixel array. The dual conversion gain transistor 150 has its source terminal connected to the floating diffusion region FD and its drain connected to a first side of an in-pixel capacitor C1. The gate of the dual conversion gain transistor 150 is connected to a dual conversion gain control signal DCG with activating voltage Vdcg. The second side of the capacitor C1 is connected to a ground potential. The capacitance of the capacitor C1 is coupled to the floating diffusion region FD when the dual conversion gain control signal DCG is applied to turn on the dual conversion gain transistor 150. Once the capacitor C1 is coupled to the floating diffusion region FD, the conversion gain of the floating diffusion region FD will decrease. Thus, the floating diffusion region FD has a second conversion gain when the dual conversion gain signal DCG turns on the dual conversion gain transistor 150. As such, the dual conversion gain transistor 150 and capacitor C1 form a conversion gain altering circuit for the floating diffusion region FD.

In the pixel 100, the maximum drain or source voltage for the transfer transistor 110, reset transistor 120, row select transistor 140 and the dual conversion gain transistor 150 is equal to the pixel supply voltage Vaapix. Therefore, the control signal activating voltages Vtx, Vrst, Vrs and Vdcg should be at least equal to the pixel supply voltage Vaapix plus a threshold voltage Vt.

Unfortunately, the threshold voltage Vt of an NMOS transistor is dependent on the individual characteristics of a transistor as well as the drain or source voltage. Thus, in the case of the transistors in pixel 100, the threshold voltage Vt for a specific transistor is dependent upon physical characteristics of the transistor and the maximum voltage supplied to the terminals of the given transistor. In FIG. 1, the maximum voltage supplied to the terminals of any of the transistors in FIG. 1 is, generally, the supply voltage Vaapix. Typically, the supply voltage Vaapix in pixel 100 is rated to have a ±10% tolerance. If, for example, the supply voltage Vaapix is rated to be 3.3V±10%, it is possible that the maximum voltage applied to a transistor source or drain is 3.6V. This means that the control voltages Vtx, Vrst, Vrs and Vdcg should each be at least 3.6V plus the threshold voltage Vt that corresponds to a source or drain voltage of 3.6V (which is, incidentally, higher than the threshold voltage Vt that corresponds to a source or drain voltage of 3.3V). Unfortunately, determining the threshold voltage Vt is complicated by the body effect of the transistors caused by their positional location in a circuit, as explained in greater detail below.

Because the required control voltages vary, one method of providing control voltages is to assume a constant threshold voltage Vt of sufficient value in order to guarantee a sufficient gate control voltage. For example, a control voltage for the transistors in pixel 100 could be made equal to the supply voltage Vaapix plus a threshold voltage Vt that is large enough to always correspond to the maximum source or drain voltage (e.g., 3.08V in the case of a rated supply voltage Vaapix of 2.8V±10%). Though this approach may be adequate for some pixel designs utilizing a lower supply voltage of 2.8V or less, it can be problematic for the pixel 100 when the supply voltage Vaapix is higher than 2.8V (e.g., 3.3V), as higher supply voltages result in applied control voltages approaching the maximum rated operational range of the transistors. By repeatedly applying unnecessarily high control voltages to the gates of NMOS transistors, hot carrier degradation of the transistors occurs and the lifetime of an image sensor using a pixel having such transistors is reduced. In other words, it is preferable to set control voltages no higher than necessary. Although the problem has been explained using, as an example, a five transistor pixel having an adjustable conversion gain, it should be evident that the problem exists in other pixel circuit designs employing NMOS transistors, as well as in other circuits using NMOS transistors.

DETAILED DESCRIPTION OF THE INVENTION

Embodiments described herein provide a method and apparatus in which both the supply voltage and threshold voltage are tracked for one or more transistors which are used in a voltage boosting arrangement to provide a gate control voltage for the one or more transistors. The embodiments described herein are for use with NMOS transistors used in pixel circuits, but they may also be used for NMOS transistors in other circuits.

Figure 2:
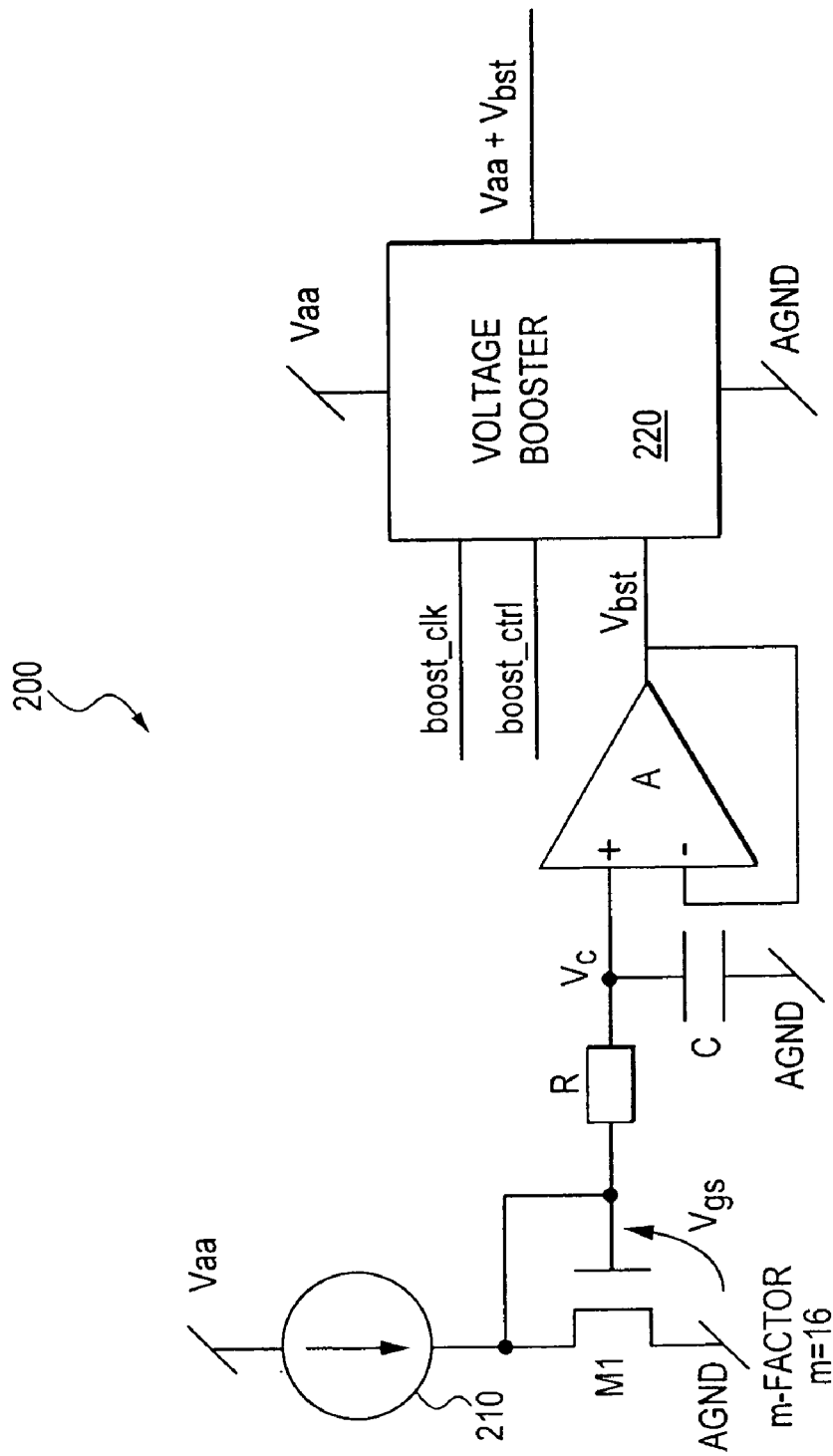
FIG. 2 is a a schematic diagram of a previously used threshold voltage tracking booster circuit.

Before describing a specific embodiment of the invention, one known threshold voltage Vt tracking circuit 200 is described with reference to FIG. 2. The threshold voltage tracking circuit 200 is an improvement from the conventional methods of just setting a maximum possible control voltage, as explained above.

Figure 1:
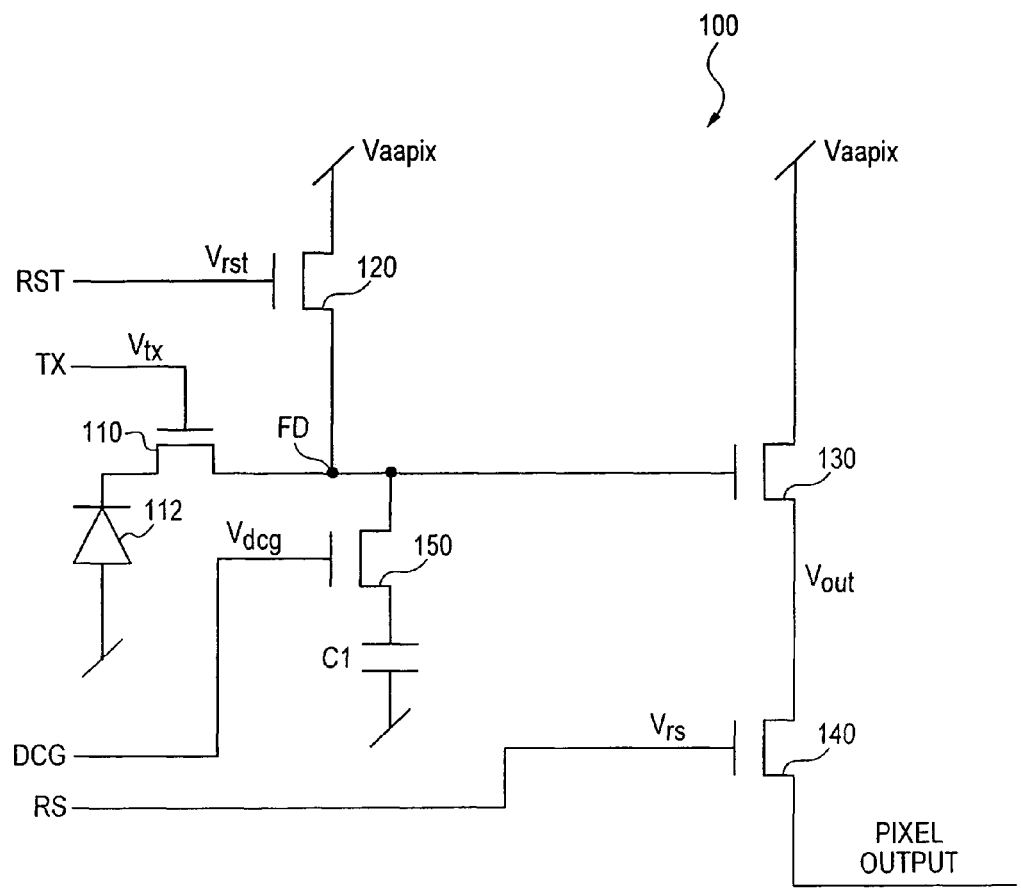
FIG. 1 is a schematic diagram of a conventional five-transistor pixel with dual conversion gain capabilities.

The circuit 200 is used to generate a control voltage Vaa+Vbst for a specific NMOS transistor in, e.g., the image sensor pixel 100 of FIG. 1. Because each transistor in pixel 100 is slightly different (both in the transistor specifications as well as manufacturing-related differences), the pixel 100 could have several, separate circuits 200 for each of the pixel switching transistors. For the FIG. 1 circuit, four such circuits are needed, one for the transfer transistor 110, one for the reset transistor 120, one for the row select transistor 140 and one for the dual conversion gain transistor 150.

In the circuit 200, transistor M1 is selected to have a width W and a length L equal to that of the pixel transistor that is to receive the control voltage Vaa+Vbst (e.g., transistors 110, 120, 140 or 150 of FIG. 1). The transistor M1 is diode-connected, meaning that the gate and the drain of transistor M1 are shorted together. The source of transistor M1 is connected to a ground potential AGND, while the drain of transistor M1 is connected to a DC bias current source 210. The DC bias current source 210 draws power from a supply voltage Vaa, which is desired to be equal to the supply voltage Vaapix of pixel 100 (e.g., Vaa=2.8V). The DC bias current is generally supplied to more than one transistor M1 so as to obtain an averaged gate-to-source voltage for the transistor M1. In the example illustrated in FIG. 2, the DC bias current is provided to 16 transistors M1 (m-factor m=16). The measured gate-to-source voltage Vgs from the m transistors M1 is combined and averaged and then filtered through an RC circuit that includes resistor R and capacitor C serially connected between the gate of transistor M1 and the ground potential AGND. The resulting voltage Vc across capacitor C is equal to Vgs/(1+jωRC) where ω is the radian frequency. Hence, at direct current, ω=0 and Vc=Vgs. The voltage Vc is passed through a unity gain buffer amplifier A which has a high input impedance (and thus does not affect the gate-to-source voltage) and a low output impedance, thus creating a near-perfect voltage source (booster voltage Vbst) for a voltage booster 220. The voltage booster 220, with clock inputs boost_clk, boost_ctrl, generates a control voltage Vaa+Vbst by boosting the source voltage Vaa with the booster voltage Vbst. One method of implementing the voltage booster 220 is disclosed in U.S. patent application Ser. No. 11/892,111.

The problem, however, is that, in the pixel 100 of FIG. 1, due to the transistor body effect, the threshold voltage Vt, and hence the gate-to-source voltage Vgs, will vary as the supply voltage Vaa varies within its ±10% tolerance. Additionally, the consequences of the body effect are different for each transistor, depending on the different doping implants for each transistor in the pixel 100 of FIG. 1.

The body effect arises when NMOS transistors are placed in series with each other. Normally, an NMOS transistor has a source-to-substrate (bulk) voltage Vsb of about 0V. However, when NMOS transistors are placed in series, the transistor source-to-substrate voltage Vsb tends to increase. The amount of increase is affected by both the position of the transistor in relation to other transistors and the voltage applied to the transistor. Thus, a varying supply voltage Vaa will result in a varying source-to-substrate voltage Vsb. Similarly, the position of the transistor in relation to other transistors will affect the source-to-substrate voltage Vsb. The varying source-to-substrate voltage Vsb directly affects theu threshold voltage Vt. The threshold voltage Vt is summarized as the sum of an initial threshold voltage Vto (wherein the source-to-substrate voltage Vsb is zero) and an additional threshold voltage due to the body effect Vtb (i.e., Vt=Vto+ Vtb).

Thus, although the circuit 200 successfully reproduces the threshold voltage Vt of transistor M1, the circuit 200 cannot accurately approximate the threshold voltage Vt of a transistor in the pixel 100 due to the inability of circuit 200 to account for the body effect of the transistor in pixel 100. The threshold voltage Vt that should be approximated is not the threshold voltage Vt of transistor M1, but is instead the threshold voltage Vt of the transistor that is to be controlled in a specific circuit, and because the body effect is transistor specific (due to transistor doping implants and due to the more specific pixel transistor doping implants), the circuit 200 cannot accurately account for the body effect of a transistor in a circuit, for example the pixel 100 circuit—it is unlikely that the body effect of a transistor M1 in circuit 200 will perfectly mimic the body effect of any given transistor. Thus, improvements to circuit 200 are desired.

The inability of circuit 200 to accurately account for the body effect of a transistor in pixel 100 is compensated for by approximating an artificially high threshold voltage Vt. However, such a practice is not advisable for circuits in which the supply voltage Vaa is greater than 2.8V. The resultant high control voltage applied to transistors (high as a result of both the high supply voltage Vaa and the artificially increased threshold voltage Vt) may near the limits of safe operation of the transistors. Thus, circuit 200 may not be well-suited for use with pixel 100 when the supply voltage Vaa is greater than 2.8V.

In order to provide more effective control voltages, it is desirable to track the threshold voltage Vt, accounting for both the specific doping implants and the body effect from voltage source variations for individual transistors, including the transistors in a pixel.

As explained above, accurate determination of the threshold voltage Vt of a transistor requires matching the transistor geometry, structure and implants. Accordingly, a threshold voltage Vt tracking circuit intended to provide transistor gate control voltages should match the layout (e.g., physical locations and arrangement) of the controlled transistors as closely as possible. In a disclosed embodiment, a pixel switching transistor is controlled using a control signal generated by the circuits of FIGS. 3 and 4 discussed below. For purposes of simplifying the disclosure, a reset transistor 120 of FIG. 1 is discussed as the controlled transistor, but it should be appreciated that the invention and embodiments described herein apply to any of the pixel switching transistors, as well as switch transistors in other circuits.

Figure 3:
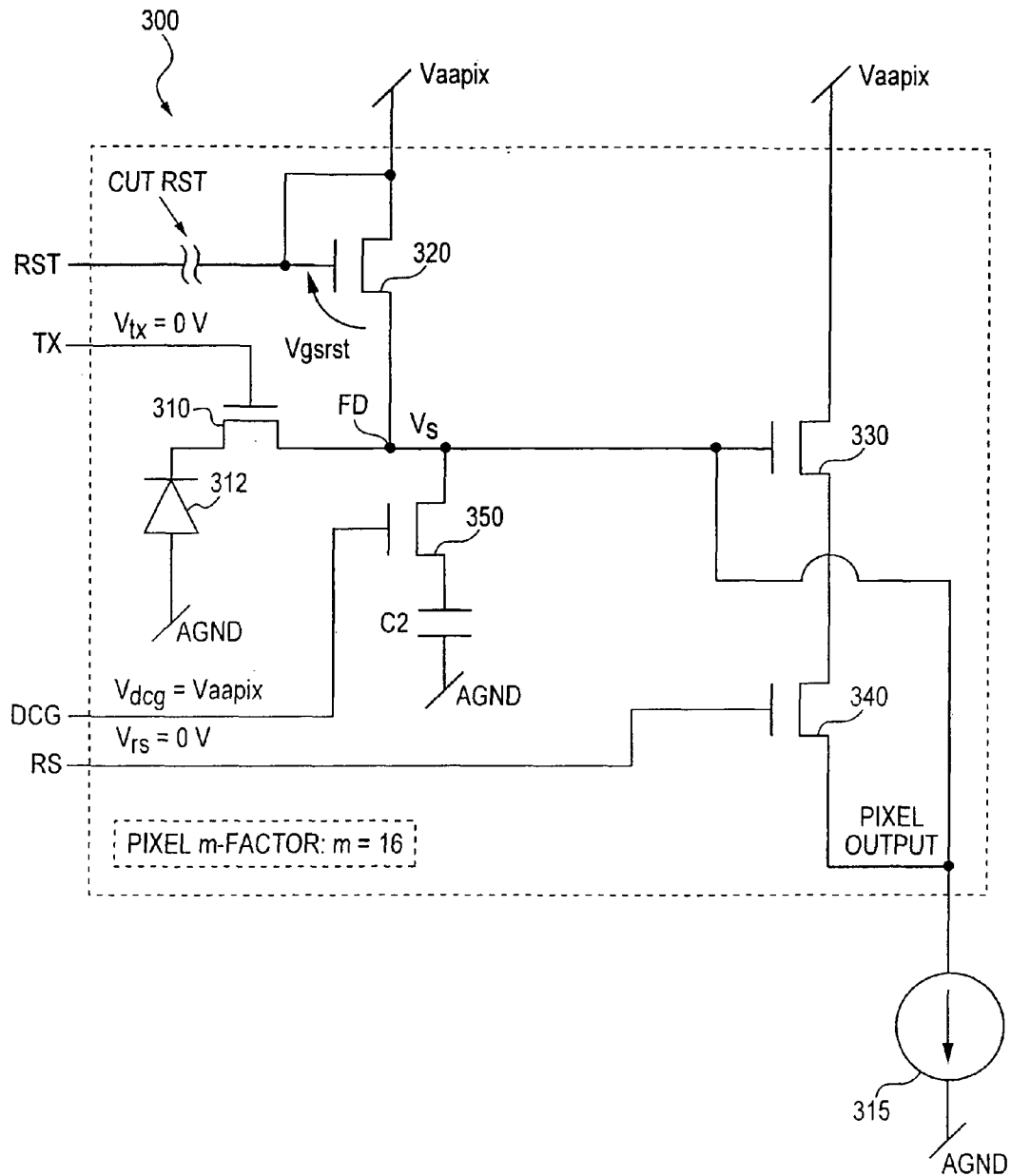
FIG. 3 is a schematic diagram of a modified pixel used to mimic the body effect of a reset transistor in a five-transistor pixel, according to the disclosed embodiments.
Figure 4:
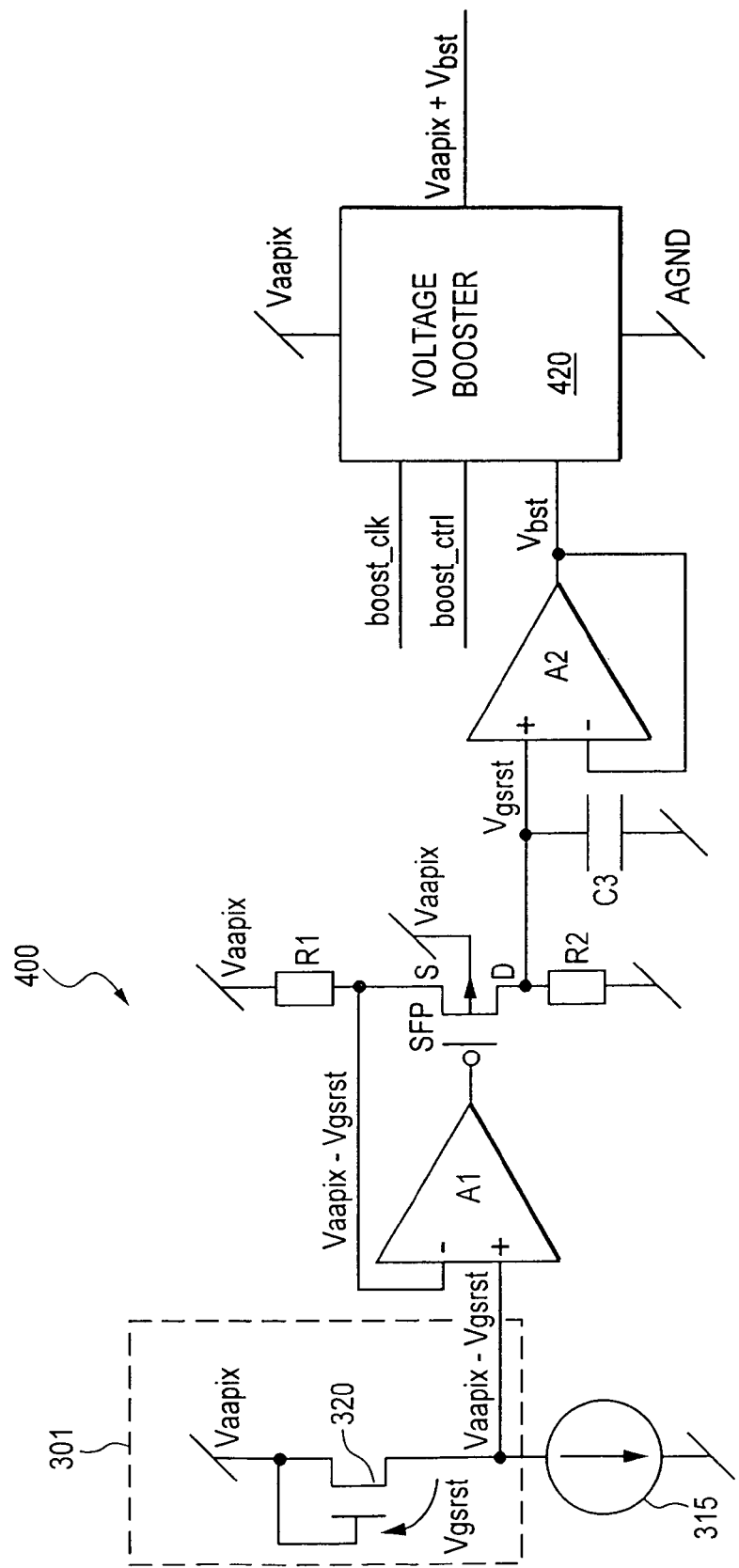
FIG. 4 is a schematic diagram of a threshold voltage tracking booster circuit for tracking the threshold voltage of a reset transistor illustrated in FIG. 3, according to the disclosed embodiments.

FIG. 3 illustrates an embodiment of a reset transistor mimicking circuit 300 while FIG. 4 illustrates an embodiment of a threshold voltage Vt tracking circuit 400. Circuit 300 of FIG. 3 is a variation of pixel circuit 100 of FIG. 1, which is used to track the threshold voltage of reset transistor 120 in FIG. 1. Circuit 300 is a modified pixel that includes the same transistors and layout as in pixel circuit 100 and is covered by a metal shield. Circuit 300 includes a transfer transistor 310, a reset transistor 320, a source follower transistor 330, a row select transistor 340 and a dual conversion gain transistor 350. The transistors of circuit 300 are laid out in the same geometry as the transistors of pixel 100. Thus, if one of the transistors of circuit 300 were to be used to determine an appropriate threshold voltage for a corresponding transistor in pixel 100, the transistor body effect should be well approximated. Circuit 300 also includes a photodiode 312 that corresponds to the photodiode 112 of pixel 100, a capacitor C2 that corresponds to the capacitor C1 of pixel 100, and a floating diffusion region FD. Circuit 300 is specifically arranged so that the reset transistor 320 mimics the reset transistor 120 and can therefore provide threshold voltage Vt tracking information used to provide an accurate reset control signal RST to reset transistor 120. In order to measure the threshold voltage of reset transistor 320, the gate and the drain of reset transistor 320 are tied together while the reset control signal line is cut. The reset transistor 320 is thus diode-connected. The transfer transistor 310 and the row select transistor 340 are effectively turned "off" by setting the transfer control signal TX to 0V (Vtx=0V) and the row select control signal RS to 0V (Vrs=0V). The dual conversion gain transistor 350 is turned "on" by setting the dual conversion gain control signal DCG to Vaapix (Vdcg=Vaapix). The potential of the floating diffusion region FD is one gate-to-source voltage drop Vgsrst below the supply voltage Vaapix when a DC current is pulled through the reset transistor 320. This is done by bypassing the source follower transistor 330 and coupling the floating diffusion region FD to a grounded DC pixel bias current source 315. The voltage of the floating diffusion region FD is thus available at the pixel output node.

Circuit 300 is simplified in FIG. 4 as labeled box 301, wherein box 301 does not show the entire layout of the circuit 300 as it relates to mimicking the body effect of reset transistor 120. As in circuit 200 of FIG. 2, m copies of circuit 300 are used in order to accurately obtain a measurement for Vaapix–Vgsrst (e.g., the m-factor m=16).

Although circuit 300 is very good at mimicking the body effect of the reset transistor 120 in pixel 100, the reset transistor 320 still underestimates the fully body effect of reset transistor 120 because in pixel 100, the source voltage Vs of the reset transistor 120 may at times be equal to the supply voltage Vaapix, whereas in circuit 300, the source voltage Vs of the reset transistor 320 is limited to a value of Vaapix–Vgsrst. The underestimation is accounted for by using as a booster voltage Vbst the gate-to-source reset voltage Vgsrst which is equal to the sum of the threshold voltage Vt and the drain-to-source saturation voltage Vdsat to substantially improve upon the tracking compared with circuit 200 of FIG. 2.

FIG. 4 illustrates an embodiment that obtains the gate-to-source reset voltage Vgsrst from the output source voltage Vs of FIG. 3. Box 301 illustrates the simplified circuit 300, which outputs the voltage Vaapix–Vgsrst. As in circuit 200, the outputs of m circuits 300 are measured and averaged together to be processed by circuit 400. The averaged output voltage Vaapix–Vgsrst is used as the sensed input voltage for a regulator circuit with amplifier A1 and a source follower P-channel MOS ("PMOS") output transistor SFP. The source follower transistor SFP facilitates the copying of the sensed voltage at the source S of the transistor SFP. Circuit 400 also includes two identical matching polysilicon resistors R1, R2 that conduct the same current. Resistor R1 is coupled between the supply voltage Vaapix and the source S of the transistor SFP. Because the potential at the source S of the transistor SFP is a copy of the potential received from circuit 300 (i.e., Vaapix–Vgsrst), resistor R1 causes a potential drop of Vgsrst thereacross. Because the resistors R1 and R2 are identical and share the same current, there is also a drop of Vgsrst across resistor R2, which is coupled between ground and the drain D of transistor SFP. Thus, the voltage across resistor R2 is Vgsrst. The voltage Vgsrst is lowpass filtered using resistor R2 and capacitor C3, and buffered by unity gain amplifier A2 to result in booster voltage Vbst. The booster voltage Vbst is used as an input to a voltage booster 420 having an output voltage of Vaapix+Vbst. This boosted voltage is supplied by row drivers of the pixel array and used to drive the gates of the pixel reset transistors with a threshold voltage almost fully compensated for the body effect.

The circuits 300, 400 of FIGS. 3 and 4 are specifically designed to generate a reset control signal RST for the reset transistor 120 of FIG. 1. In order to provide control signals for other transistors in pixel 100, additional modified pixels are used, as explained below in reference to FIGS. 5A-8.

Figure 5A:
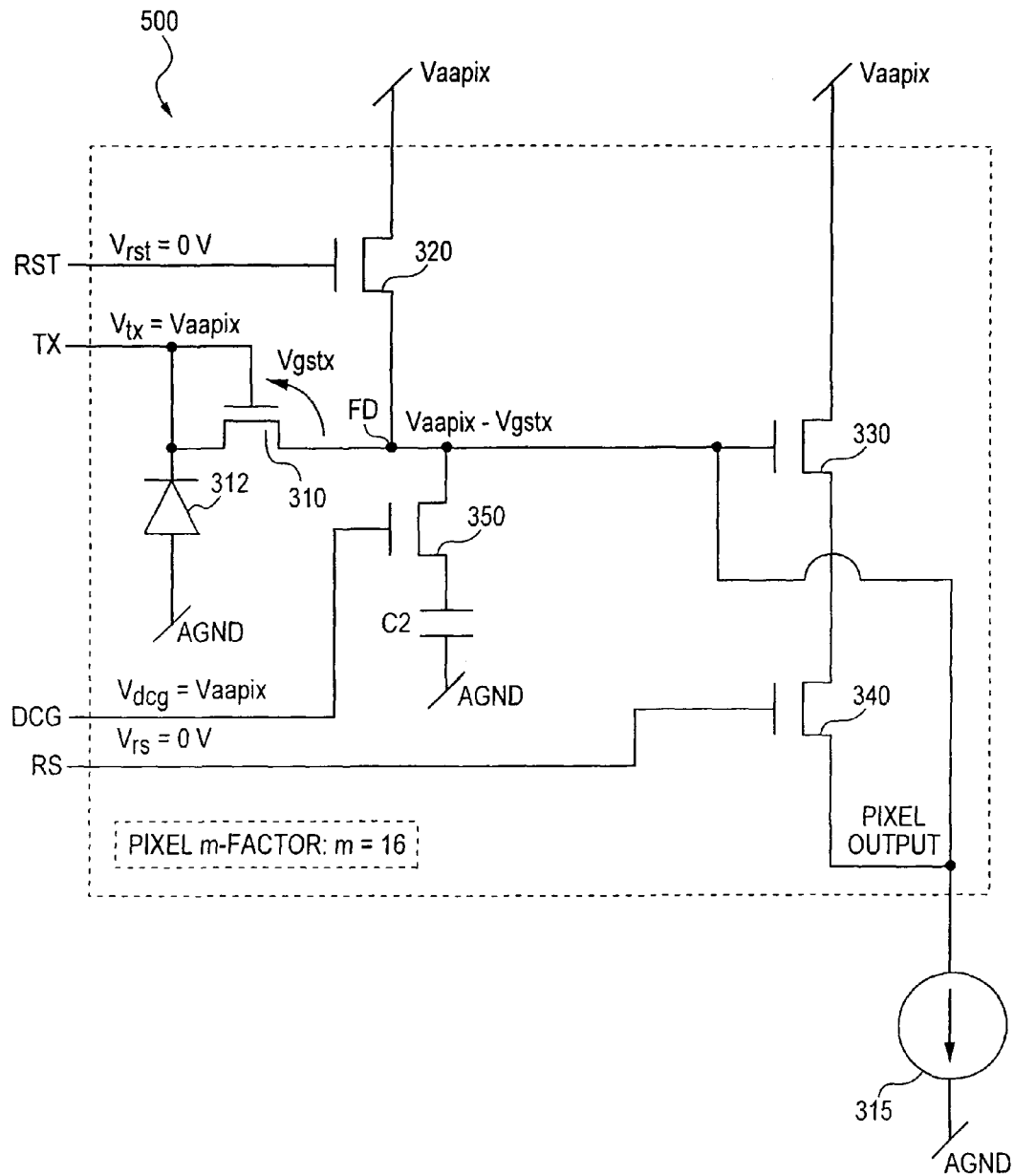
FIGS. 5A and 5B are schematic diagrams of a modified pixel used to mimic the body effect of a transfer gate in a five-transistor pixel, according to the disclosed embodiments.

FIG. 5A illustrates an embodiment of a circuit 500 that mimics the transfer transistor 110 of FIG. 1. Circuit 500 is a modified pixel with transistors 310, 320, 330, 340 and 350, just as in circuit 300 of FIG. 3. However, unlike circuit 300, circuit 500 modifies the connections associated with the transfer transistor 310 instead of the reset transistor 320. In circuit 500, transfer transistor 310 is modified so that the transistor drain and gate are shorted together and tied to the supply voltage Vaapix (which is provided as transfer voltage Vtx of the transfer signal TX). As in circuit 300, the control signals DCG and RS are set at Vdcg=Vaapix and Vrs=0V, respectively. The reset control signal RST is set at Vrst=0V. The floating diffusion region FD collects the gate-to-source transfer voltage Vgstx of transfer transistor 310 as a DC current is pulled through the transistor 310 via a grounded DC pixel bias current source 315. The output of the circuit 500 is available at the pixel output node and is equal to Vaapix–Vgstx.

Figure 5B:
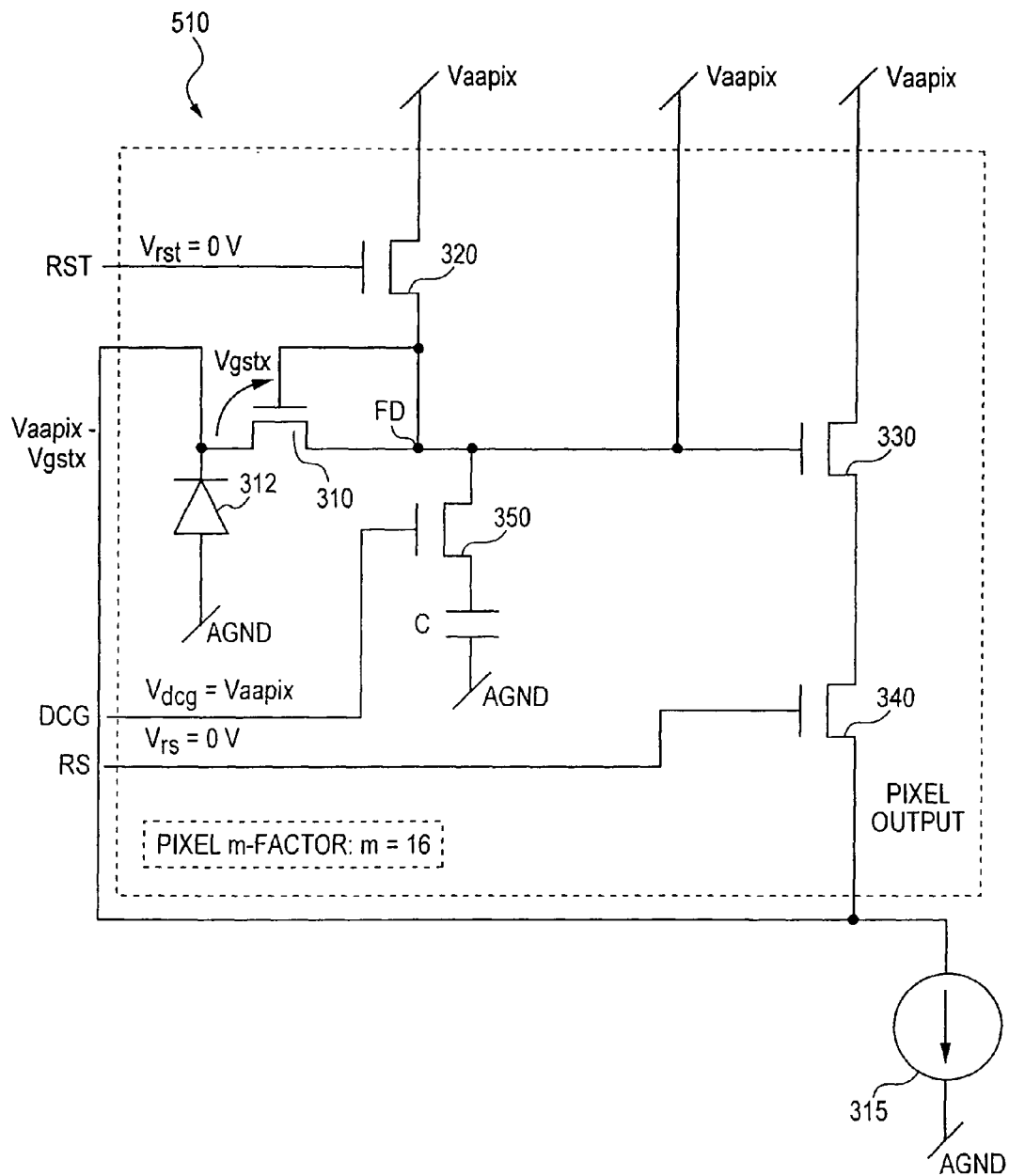

FIG. 5B illustrates an embodiment of a circuit 510 which represents an improvement of circuit 500 of FIG. 5A. Like circuit 500 of FIG. 5A, circuit 510 is also used to mimic the transfer transistor 110 of FIG. 1. Circuit 510 is a modified pixel with transistors 310, 320, 330, 340 and 350, just as in circuit 500 of FIG. 5A. Also as in circuit 500, circuit 510 modifies the connections associated with the transfer transistor 310 so that the transfer transistor 310 is diode-connected. However, in circuit 510, the gate and the drain of transistor 310 are shorted together and tied to the supply voltage Vaapix. The transfer signal TX line is cut and a connection is made between the source of the transfer transistor and the pixel output node of the circuit 510. As in circuit 500, the control signals DCG and RS are set at Vdcg=Vaapix and Vrs=0V, respectively. The reset control signal RST is set at Vrst=0V. However, in circuit 510, the direction of positive DC current flow through the transfer transistor 310 is reversed relative to the direction in FIG. 5A. In circuit 510, the direction of positive DC current flow through the transfer transistor 310 is the same as that during a signal charge transfer from the photo diode to the floating diffusion region FD in pixel 100. The direction of positive DC current flow is also the same as during a photo diode reset operation in a pixel 100. Thus, circuit 510 more closely duplicates the behavior of a pixel 100 during signal transfer and photo diode reset operations. The source of the transfer transistor 310 collects the gate-to-source transfer voltage Vgstx of transfer transistor 310 as a DC current is pulled through the transistor 310 via a grounded DC pixel bias current source 315. The output of the circuit 510 is available at the pixel output node and is equal to Vaapix−Vgstx.

Figure 6:
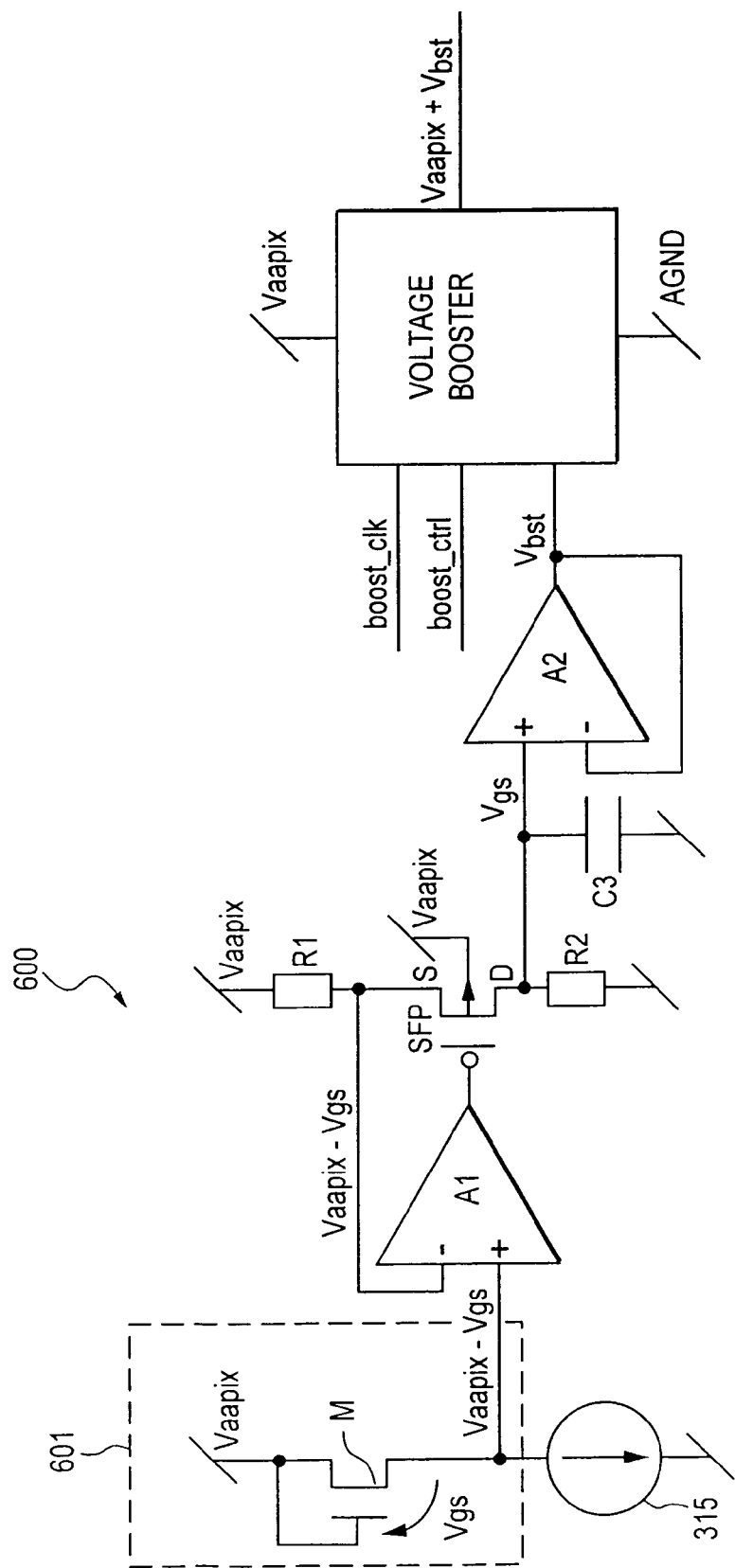
FIG. 6 is a schematic diagram of a threshold voltage tracking booster circuit, according to the disclosed embodiments.

FIG. 6 illustrates an embodiment of a generic version of circuit 400 which may be applied to any switch transistor within a pixel to provide an appropriate boosted gate voltage. Circuit 600 of FIG. 6 includes box 601 representing a simplified version of a pixel mimicking circuit (e.g., circuits 300, 500, 510) whose output is equal to Vaapix−Vgs, where the gate-to-source voltage Vgs is the gate-to-source voltage for the modified transistor M. Thus, in the transistor-specific circuits 300, 500, 510 with outputs equal to Vaapix−Vgsrst and Vaapix−Vgstx, respectively, these outputs are generically represented in FIG. 6 as Vaapix−Vgs. The circuit 600 operates just as circuit 400 does, and outputs a boosted voltage equal to Vaapix+Vbst, where Vbst is essentially equal to Vgs of the transistor being controlled. In the case of the transfer transistor 110 being controlled, circuits 500, 510 of FIGS. 5A and 5B are used to output a voltage equal to Vaapix−Vgstx to circuit 600, which then outputs a boosted voltage that is essentially equal to Vaapix+Vgstx.

Figure 7:
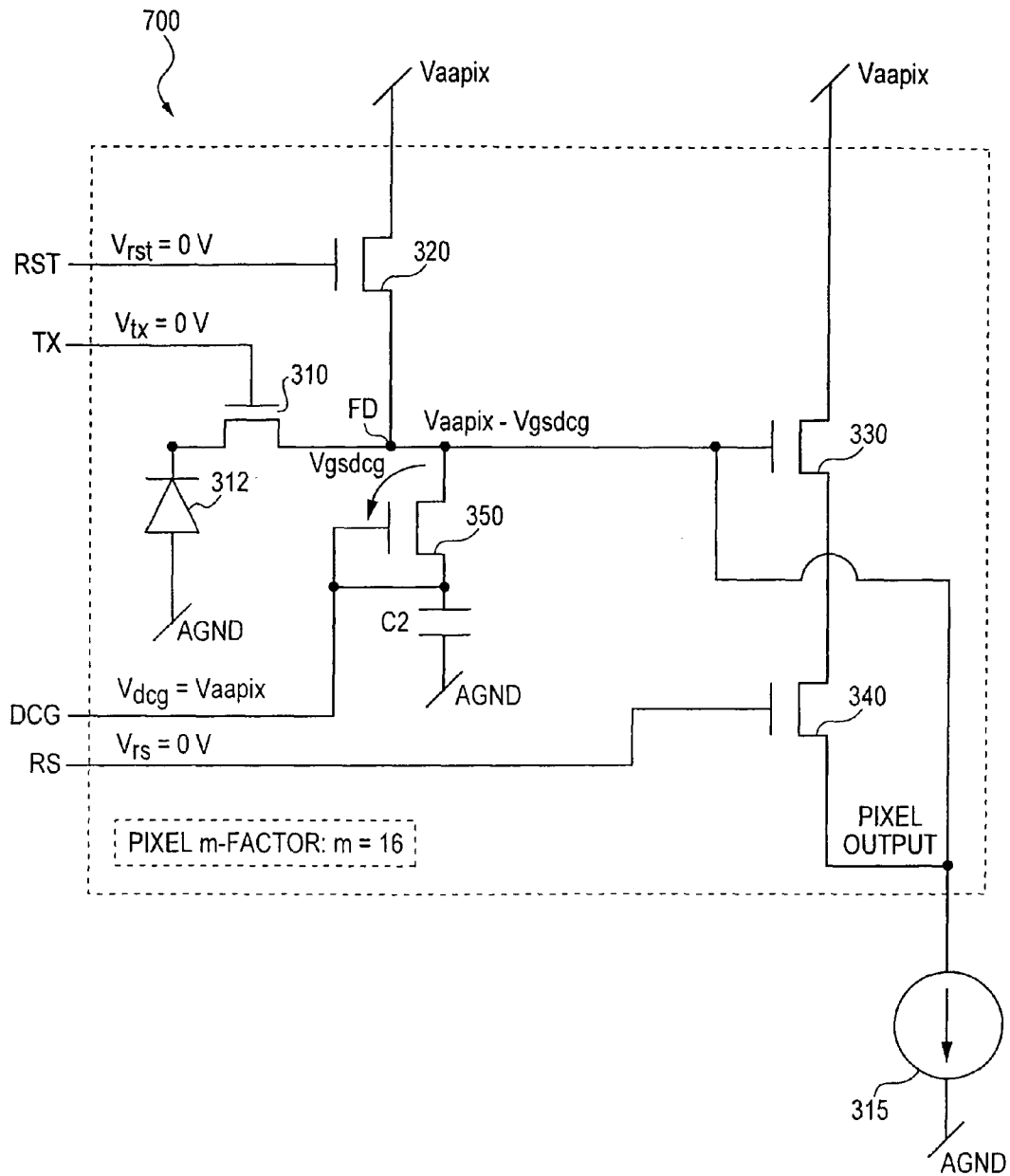
FIG. 7 is a schematic diagram of a modified pixel used to mimic the body effect of a dual conversion gain transistor in a five-transistor pixel, according to the disclosed embodiments.

FIG. 7 illustrates an embodiment of a circuit 700 that mimics the dual conversion gain transistor 150 of FIG. 1. Circuit 700 is a modified pixel with transistors 310, 320, 330, 340 and 350, just as in circuit 300 of FIG. 3. However, unlike circuit 300, circuit 700 modifies the connections associated with the dual conversion gain transistor 350 instead of the reset transistor 320. In circuit 700, dual conversion gain transistor 350 is modified so that the transistor drain and gate are shorted together and tied to the supply voltage Vaapix (which is provided as dual conversion gain voltage Vdcg of the dual conversion gain signal DCG). The control signals TX and RS are set at Vtx=0V and Vrs=0V, respectively. The reset control signal RST is set at Vrst=0V. The floating diffusion region FD collects the gate-to-source voltage Vgsdcg of the dual conversion gain transistor 350 as a DC current is pulled through the transistor 350 via a grounded DC pixel bias current source 315. The output of the circuit 700 is available at the pixel output node and is equal to Vaapix−Vgsdcg.

The output from circuit 700 is processed through circuit 600 to produce a control voltage for the dual conversion gain transistor 150 of pixel 100 that is equal to Vaapix+Vgsdcg.

Figure 8:
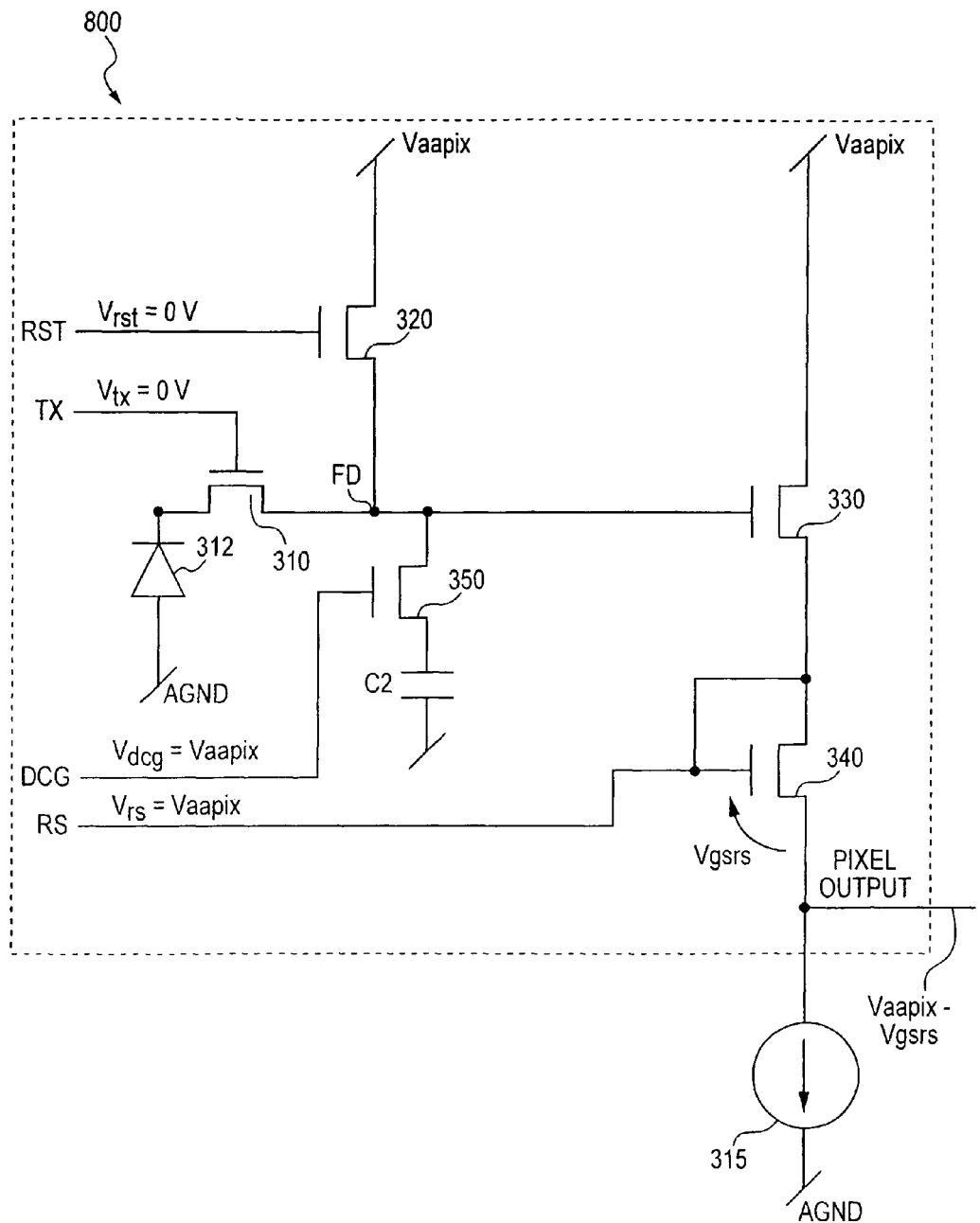
FIG. 8 is a schematic diagram of a modified pixel used to mimic the body effect of a row select transistor in a five-transistor pixel, according to the disclosed embodiments.

FIG. 8 illustrates an embodiment of a circuit 800 that mimics the row select transistor 140 of FIG. 1. Circuit 800 is a modified pixel with transistors 310, 320, 330, 340 and 350, just as in pixel 100 of FIG. 1. However, unlike pixel 100, circuit 800 modifies the connections associated with the row select transistor 340. In circuit 800, row select transistor 340 is modified so that the transistor drain and gate are shorted together and tied to the supply voltage Vaapix (which is provided as voltage Vrs of the row select signal RS). The control signals DCG, TX and RST are set at Vdcg=Vaapix, Vtx=0V and Vrst=0V, respectively. DC current is pulled through the transistor 340 via a grounded DC pixel bias current source 315. The output of the circuit 800 is available at the pixel output node and is equal to Vaapix−Vgsrs.

The output from circuit 800 is processed through circuit 600 to produce a control voltage for the row select transistor 140 of pixel 100 that is equal to Vaapix+Vgsrs.

Figure 9:
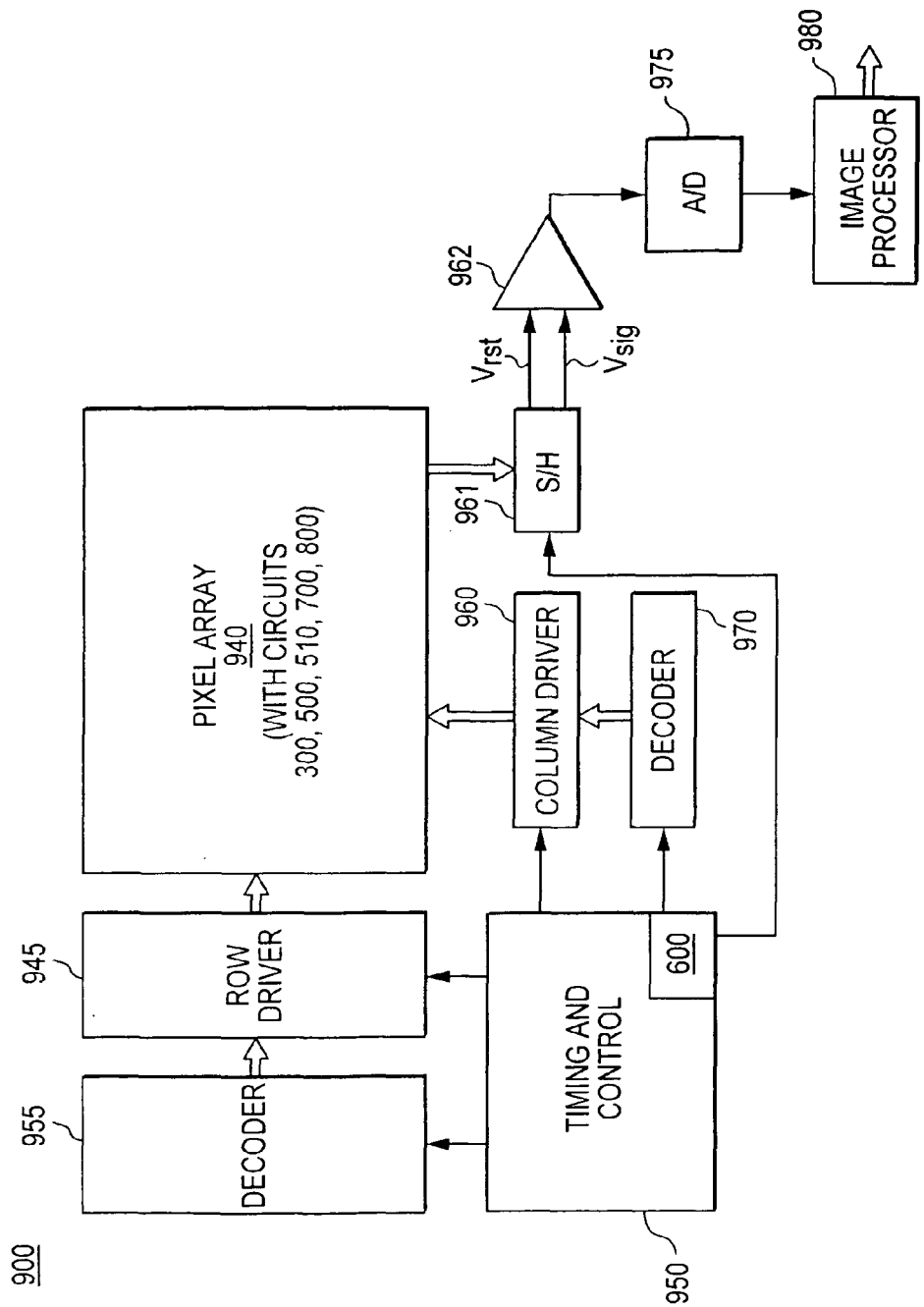
FIG. 9 is a block diagram of an imager, according to the disclosed embodiments.

Circuits 300-800 (including circuit 510) may be implemented as part of an imager or imager system. FIG. 9 illustrates a block diagram of a semiconductor CMOS imager 900 having a pixel array 940 including a plurality of pixels arranged in a predetermined number of columns and rows. Most pixels in the array 940 are configured to receive incident photons and to convert the incident photons into electrical signals. However, some pixels in array 940 are modified to output a signal to be used in generating a control signal for the photon-sensing pixels. The modified pixels include at least m pixels with circuits 300, m pixels with circuits 500, m pixels with circuits 700, and m pixels with circuits 800. The outputs of circuits 300, 500, 510, 700, 800 are processed by a circuit 600, which may be located in a timing, control and booster circuit 950. Pixels of pixel array 940 are output row-by-row as activated by a row driver 945 in response to a row address decoder 955. Column driver 960 and column address decoder 970 are also used to selectively activate individual pixel columns. The timing, control and booster circuit 950 controls address decoders 955, 970 for selecting the appropriate row and column lines for pixel readout. The timing, control and booster circuit 950 also controls the row and column driver circuitry 945, 960 such that driving voltages may be applied. Thus, the timing, control and booster circuit 950 controls both when an output from a modified pixel with circuits 300, 500, 510, 700, 800 is received and when the appropriate control signal using the received output is input back to the pixel array 940 as a gate switching signal to control a pixel transistor.

Each imaging pixel of the pixel array 940 generally outputs both a pixel reset signal $v_{rst}$ and a pixel image signal $v_{sig}$, which are read by a sample and hold circuit 961 according to a correlated double sampling ("CDS") scheme. The pixel reset signal $v_{rst}$ represents a reset state of a pixel. The pixel image signal $v_{sig}$ represents the amount of charge generated by the photosensor in the pixel in response to applied light during an integration period. The pixel reset and image signals $v_{rst}$, $v_{sig}$ are sampled, held and amplified by the sample and hold circuit 961. The difference between $V_{sig}$ and $V_{rst}$ represents the actual pixel output with common-mode noise eliminated. The differential signal ($V_{rst}-V_{sig}$) is produced by differential amplifier 962 for each readout pixel. The differential signals are digitized by an analog-to-digital converter 975. The analog-to-digital converter 075 supplies the digitized pixel signals to an image processor 980, which forms and outputs a digital image.

The embodiments described above may be used in any imager device that has pixels with switching transistors, and is not limited to the particular pixel circuits used in the example embodiments described above. The described embodiments may be modified for use with switching NMOS transistors in other circuits as well. In addition, systems employing imager devices utilizing embodiments described herein may include, but are not limited to, a computer system, camera system, scanner, machine vision, vehicle navigation, video phone, surveillance system, auto focus system, star tracker system, motion detection system, image stabilization system, and other imaging systems. Example digital camera systems in which the invention may be used include both still and video digital cameras, cell-phone cameras, handheld personal digital assistant (PDA) cameras, and other types of cameras.

Additionally, embodiments of the invention also include fabrication of integrated circuit imagers containing pixel arrays with imaging pixels and modified pixels as described herein as well as methods of operating the described embodiments.

Figure 10:
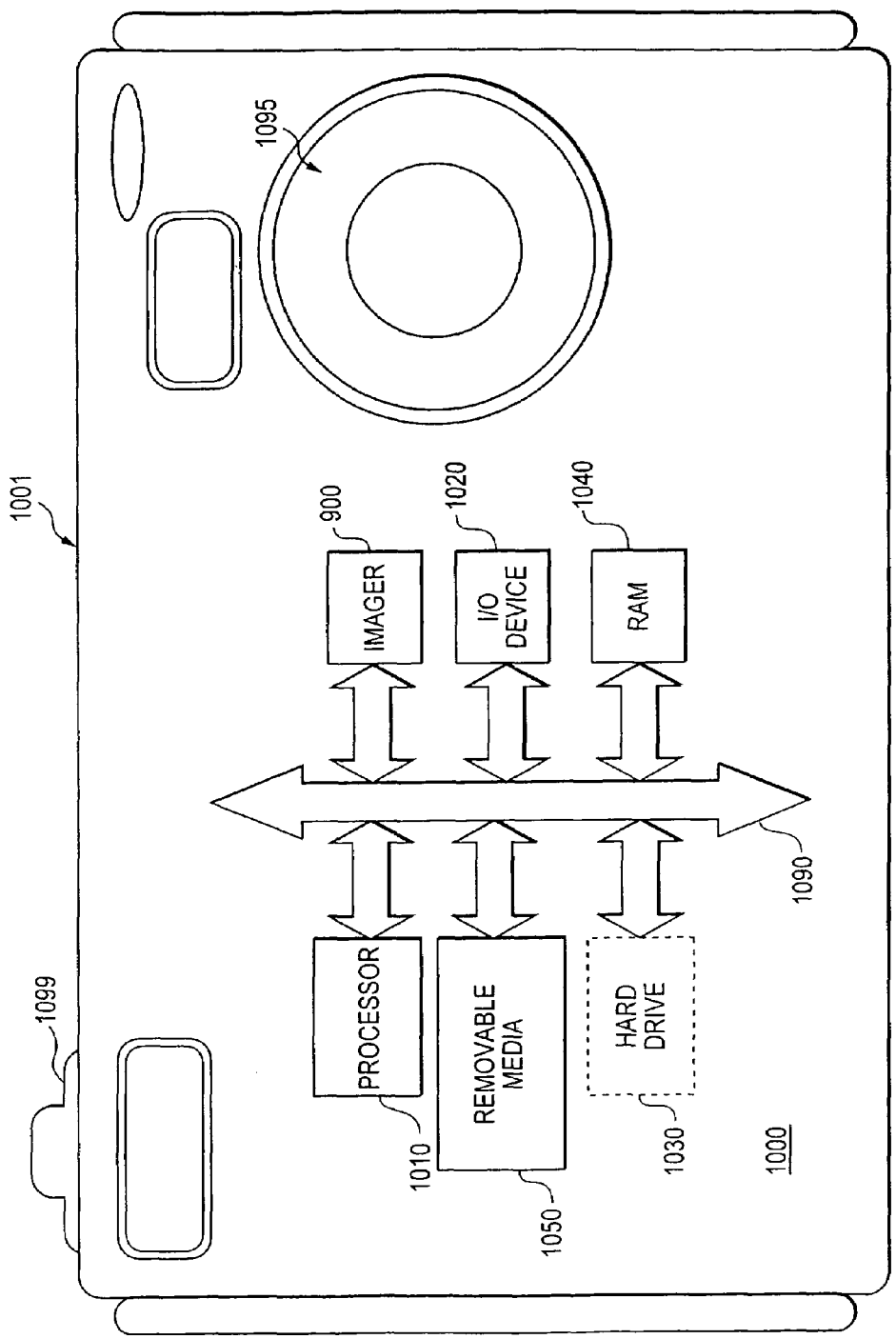
FIG. 10 is a block diagram of an imaging system, according to the disclosed embodiments.

FIG. 10 shows an example of a system 1000 which is part of a digital camera 1001. The system 1000 includes an imaging device 900 which includes embodiments constructed as described above. System 1000 generally comprises a processing unit 1010, such as a microprocessor, that controls system functions and which communicates with an input/output (I/O) device 1020 over a bus 1090. Imaging device 900 also communicates with the processing unit 1010 over the bus 1090. The processor system 1000 also includes random access memory (RAM) 1040, and can include removable media 1050, such as flash memory, which also communicates with the processing unit 1010 over the bus 1090. Lens 1095 focuses an image on a pixel array of the imaging device 900 when shutter release button 1099 is pressed.

The processor system 1000 could alternatively be part of a larger processing system, such as a computer. Through the bus 1090, the processor system 1000 illustratively communicates with other computer components, including but not limited to, a hard drive 1030 and one or more removable media devices 1050. The imaging device 900 may be combined with a processor, such as a central processing unit, digital signal processor, or microprocessor, with or without memory storage on a single integrated circuit or on a different chip than the processor.

What is claimed as new and desired to be protected by Letters Patent of the United States is:

1. An apparatus for generating a control signal for operating a controllable transistor in a first circuit, the apparatus comprising:
    a circuit which has a transistor layout that replicates the transistor layout of the first circuit, the circuit including a first transistor which corresponds to the controllable transistor in the first circuit, the first transistor being operable to cause generation of an output voltage representing an operational characteristic of the controllable transistor; and
    a circuit for generating a boosted gate voltage for the controllable transistor in response to the output voltage.

2. The apparatus of claim 1, wherein the first transistor is diode-connected.

3. The apparatus of claim 1, wherein the circuit for generating a boosted gate voltage includes a threshold voltage tracking circuit to receive the output voltage and generate a threshold voltage that approximates the threshold voltage of the controllable transistor, the boosted gate voltage being generated using the threshold voltage.

4. The apparatus of claim 3, wherein the circuit for generating a boosted gate voltage includes a booster circuit for receiving the threshold voltage and outputting the boosted gate voltage as a supply voltage for the controllable transistor.

5. The apparatus of claim 3, wherein the threshold voltage tracking circuit includes a regulator amplifier that receives the output voltage, a source follower transistor for generating the threshold voltage from the modified pixel output voltage, and a buffer amplifier for outputting the threshold voltage.

6. The apparatus of claim 1, wherein the first circuit is a pixel circuit and the controllable transistor is a switching transistor of the pixel circuit.

7. The apparatus of claim 6, wherein the first transistor is coupled between a supply voltage and an output region of the pixel circuit, the supply voltage being connected to a drain and gate of the first transistor, and the output region being connected to a source of the first transistor, a direct current source being coupled between the output region and ground.

8. The apparatus of claim 6, wherein the first transistor corresponds to one of a reset transistor and a row select transistor of the pixel circuit.

9. The apparatus of claim 6, wherein the first transistor corresponds to a transfer transistor of the pixel circuit.

10. The apparatus of claim 6, wherein the first transistor corresponds to a conversion gain control transistor of the pixel circuit.

11. The apparatus of claim 1, wherein the first circuit is a pixel circuit and the first transistor is a diode-connected transistor corresponding to a reset transistor in the pixel circuit.

12. The apparatus of claim 1, wherein the first circuit is a pixel circuit and the first transistor is a diode-connected transistor corresponding to a transfer transistor in the pixel circuit.

13. The apparatus of claim 1, wherein the first circuit is a pixel circuit and the first transistor is a diode-connected transistor corresponding to a dual conversion gain transistor in the pixel circuit.

14. The apparatus of claim 1, wherein the first circuit is a pixel circuit and the first transistor is a diode-connected transistor corresponding to a row select transistor in the pixel circuit.

* * * * *